(12) United States Patent
Willinger (10) Patent No.: US 7,866,281 B2
(45) Date of Patent: Jan. 11, 2011

(54) BAFFLED TREATBALL

(75) Inventor: Jonathan Willinger, Tenafly, NJ (US)

(73) Assignee: J. W. Pet Company, Inc., Teterboro, NJ (US)

( * ) Notice: Subject to any disclaimer, the term of this patent is extended or adjusted under 35 U.S.C. 154(b) by 0 days.

(21) Appl. No.: 12/709,820

(22) Filed: Feb. 22, 2010

(65) Prior Publication Data

US 2010/0201033 A1    Aug. 12, 2010

Related U.S. Application Data

(63) Continuation of application No. 11/434,557, filed on May 15, 2006, now abandoned.

(60) Provisional application No. 60/681,004, filed on May 13, 2005.

(51) Int. Cl.
    *A01K 29/00* (2006.01)
    *B28B 7/16* (2006.01)

(52) U.S. Cl. .................... 119/710; 264/313

(58) Field of Classification Search ............ 119/710, 119/711, 702, 707; 264/313, 318, 239, 344
    See application file for complete search history.

(56) References Cited

U.S. PATENT DOCUMENTS

| | | | |
|---|---|---|---|
| D080,740 S | 3/1930 | Perry | |
| 3,135,512 A * | 6/1964 | Taylor | 273/109 |
| 3,158,955 A * | 12/1964 | Sturgis | 446/140 |
| D219,284 S | 11/1970 | Hunt | |
| 3,633,587 A | 1/1972 | Hunt | |
| 3,889,950 A | 6/1975 | Kasravi | |
| 4,248,424 A | 2/1981 | Judkins | |
| 4,302,901 A | 12/1981 | Psyras | |
| D332,982 S | 2/1993 | Norman et al. | |
| 5,207,420 A | 5/1993 | Crawford et al. | |
| 5,224,959 A | 7/1993 | Kasper | |
| 5,236,196 A | 8/1993 | Blankenburg et al. | |
| 5,269,526 A | 12/1993 | Wollstein | |
| D359,327 S | 6/1995 | Gould | |
| 5,758,604 A * | 6/1998 | Jorgensen | 119/711 |
| 5,807,192 A | 9/1998 | Yamagishi et al. | |
| 5,813,366 A * | 9/1998 | Mauldin, Jr. | 119/710 |
| 5,819,690 A * | 10/1998 | Brown | 119/707 |
| D411,335 S | 6/1999 | Hester | |
| 5,941,197 A | 8/1999 | Axelrod | |
| 5,965,182 A * | 10/1999 | Lindgren | 426/104 |
| 6,003,470 A | 12/1999 | Budman | |

(Continued)

OTHER PUBLICATIONS

U.S. Office Action dated Jan. 9, 2009, from the corresponding U.S. Appl. No. 11/434,557.

(Continued)

*Primary Examiner*—Yvonne R. Abbott
(74) *Attorney, Agent, or Firm*—Katten Muchin Rosenman LLP (57) ABSTRACT

A treatball for storing and dispensing pet treats has an elastic body and is restorably compressible in response to an external force applied to the body and has a plurality of spaced-apart internal baffles. A method of making the treatball includes providing an internal mold, introducing an elastomeric material onto the internal mold, molding the elastomeric material into a shape that is representative of the treatball, and extracting the internal mold through an opening in the treatball. Therein, the elastomeric material has sufficient hot tear resistance to allow the internal mold to be extracted through the opening of the treatball without tearing the treatball.

11 Claims, 7 Drawing Sheets

U.S. PATENT DOCUMENTS

| | | | | |
|---|---|---|---|---|
| 6,073,581 | A * | 6/2000 | Wang | 119/51.01 |
| 6,098,571 | A * | 8/2000 | Axelrod et al. | 119/707 |
| 6,142,886 | A | 11/2000 | Sullivan et al. | |
| 6,148,771 | A * | 11/2000 | Costello | 119/709 |
| 6,186,095 | B1 | 2/2001 | Simon | |
| 6,190,269 | B1 | 2/2001 | Moriyama | |
| 6,199,509 | B1 * | 3/2001 | Mostyn et al. | 119/51.01 |
| 6,200,616 | B1 | 3/2001 | Axelrod et al. | |
| 6,403,003 | B1 | 6/2002 | Fekete et al. | |
| 6,557,496 | B2 * | 5/2003 | Herrenbruck | 119/707 |
| 6,622,659 | B2 | 9/2003 | Willinger | |
| 6,651,590 | B2 | 11/2003 | Willinger et al. | |
| 7,270,085 | B2 * | 9/2007 | Wolfe et al. | 119/709 |
| 7,640,894 | B2 * | 1/2010 | Jager | 119/710 |
| 2003/0079693 | A1 * | 5/2003 | Jager | 119/707 |
| 2004/0134434 | A1 * | 7/2004 | Kraft et al. | 119/51.01 |
| 2005/0045115 | A1 * | 3/2005 | Mann | 119/711 |
| 2005/0045515 | A1 | 3/2005 | Mullin | |
| 2005/0115517 | A1 * | 6/2005 | Wolfe et al. | 119/707 |
| 2007/0022971 | A1 * | 2/2007 | Renforth et al. | 119/707 |
| 2007/0289553 | A1 * | 12/2007 | Jager | 119/710 |
| 2008/0017131 | A1 * | 1/2008 | Wolfe et al. | 119/709 |
| 2008/0175962 | A1 * | 7/2008 | Grammer et al. | 426/134 |

OTHER PUBLICATIONS

U.S. Office Action dated Feb. 25, 2009, from the corresponding U.S. Appl. No. 11/434,557.

U.S. Office Action dated Jul. 28, 2009, from the corresponding U.S. Appl. No. 11/434,557.

U.S. Office Action dated Nov. 17, 2009, from the corresponding U.S. Appl. No. 11/434,557.

U.S. Office Action dated Dec. 8, 2009, from the corresponding U.S. Appl. No. 11/434,557.

* cited by examiner

BAFFLED TREATBALL

CROSS-REFERENCE TO RELATED APPLICATION

This application is a continuation of and claims priority to U.S. Ser. No. 11/434,557 filed on May 15, 2006, which is pending and which is hereby incorporated by reference in its entirety for all purposes.

U.S. Ser. No. 11/434,557 is a non-provisional counterpart to and claims priority to U.S. Ser. No. 60/681,004 filed on May 13, 2005 and is hereby incorporated by reference in its entirety for all purposes.

BACKGROUND OF THE INVENTION

1. Field of the Invention

The invention relates generally to pet amusement and exercise equipment and, more particularly, to a treat dispensing toy capable of attracting and generating interaction with a pet animal. The invention furthermore relates to a toy having a unitary, one-piece construction.

2. Discussion of the Related Art

For dogs and other animal companions, toys are not a luxury, but a necessity. Toys help fight boredom in pets left alone, and toys can even help prevent some problem behaviors from developing. Many factors contribute to the "right" toy, and a number of them depend upon the pet's size, activity level, and preferences.

Many pet toys should be interactive. For example, interactive play is very important for pet dogs because dogs need active "people time"—and such play also enhances the bond between the pet owner and pet. By focusing on a specific task—such as repeatedly returning a ball or playing "hide-and-seek" with treats or toys—a pet can expel pent-up mental and physical energy in a limited amount of time and space. This greatly reduces stress due to confinement, isolation, and boredom. For young, high-energy, and untrained dogs, interactive play also offers an opportunity for socialization and helps the dogs to learn about appropriate and inappropriate behavior, such as jumping up or being mouthy.

The goal of animal toy designers is to make the toy attractive to the animal and to the animal caretaker. A toy is attractive to an animal when it presents a challenge that is neither too easy nor too difficult to solve and rewards the animal. The toy is attractive to the caretaker when the toy has good playability, durability, and quality of construction and occupies the interests of the animal.

Figure 6:
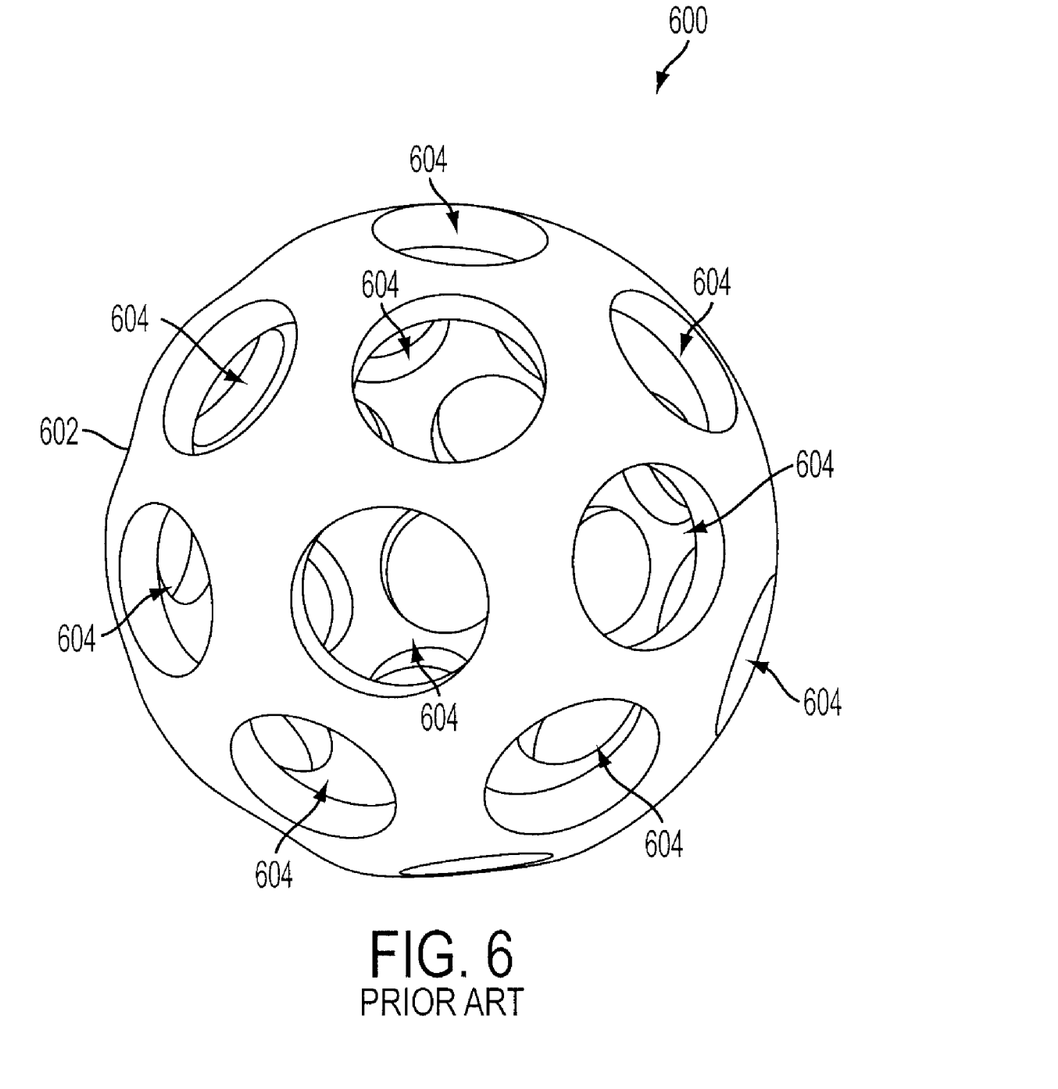
FIG. 6 is a perspective view of a prior art treatball.

The term "treatball" generally refers to a class of animal toys, typically dog toys, wherein one or more edible treats may be placed into a ball and the treat and/or treats are dispensed as the animal interacts with the toy. In interacting with the toy, the animal follows its natural instinct to obtain food and performs problem solving tasks that engage the animal's mind. Typically, treat dispensing toys are in the form of solid-covered, non-spheroid toys, such as bone-shaped toys or balls with a series of regular or irregular openings through which is dispensed the treat, which is usually shaped to be insertable along only one axis. Turning to FIG. 6, an example of a convention spheroid-shaped treatball 600 is depicted. The prior art treatball 600 consists of an outer shell 602 with a number of openings 604 for inserting/accessing treats.

Prior art, ball-shaped treatballs 600 are generally designed and intended to only be rolled by the pet owner or chewed by the pet, but not thrown by the pet owner. Typically the materials used may not bounce and roll well on soft or irregular surfaces such as a grass field. In addition, the insertion/access openings 604 of conventional designs may allow treats to prematurely fall out without animal interaction, particularly if the conventional treatballs are thrown or bounced. Thus, such conventional treatballs 600 do not have bounce or interactivity characteristics that excite and engage an animal. Although non-spheroid toys that dispense treats may retain treats better than conventional ball-shaped treatballs 600 and thus may be more interactive, such toys may not have desirable bounce and roll characteristics. In either case, prior art treat dispensing toys do not provide impact protection to inserted treats and when bounced, treats may crumble and prematurely fall out of the toy.

Accordingly, a need exists for a toy that offers at once the desirable bounce and roll characteristics of a spheroid-shaped treatball and also the engaging aspect of a treat dispensing toy that requires an animal to interact with the treatball in order to cause treats to be dispensed at the appropriate time in response to the animal's efforts.

A further need exists for the toy that permits a person to find enjoyment interacting with a pet.

Still a further need exists for the toy that combines rolling, bouncing and interactivity characteristics that can amuse and attract the pet.

Yet, a further need exists to make the manufacture of the toy as simple as possible.

SUMMARY OF THE INVENTION

In accordance with the invention, an improved treatball is disclosed that has the desirable bounce and roll characteristics of a spheroid-shaped treatball and also the engaging aspect of a treat dispensing toy that requires an animal to interact with the treatball in order to cause treats to be timely dispensed in response to the animal's efforts. Specifically, the toy includes a spherical solid outer cover or exterior wall that has a covered opening for treat insertion and a diametrically disposed opening for treat dispensing. Within the inventive treatball, a series of baffles define a path through the toy from the covered opening to the treat dispensing opening. The path may include a series of interconnected chambers through which treats inserted into the covered opening must be made to traverse in order to reach the dispensing opening.

In use, treats are preferably inserted at the covered end by the pet owner and the toy is thrown or kicked to the pet. As the toy bounces and rolls, the preferably elastic structure of the toy protects the treats (e.g., hard baked and relatively brittle dog biscuits) from crushing impacts. Once the animal begins interacting with the treatball, e.g., via shaking, tossing, compressing, pawing, chasing, scratching, bouncing, etc., the treats are advanced past the baffles, through the toy, and eventually dispensed through the unobstructed opening.

In some embodiments, the treatball of the present invention may be part of a system or kit wherein the treat size and ball size are associated with each other. For example, smaller treats may be used with smaller balls and larger treats may be used with larger balls. Such a system may, for example, allow small dogs, who may be only capable of consuming small treats, to enjoy playtime with a small-sized treatball and prevent such small treats from prematurely dispensing from an inappropriately large treatball.

In accordance with one or more embodiments, the treatball is made using an internal mold that upon formation of the ball is removed through an opening of the treatball.

The above and other features of the invention will become more readily apparent from the following detailed description accompanied by the following drawings.

DETAILED DESCRIPTION OF THE INVENTION

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, left, right, up, down, over, above, below, beneath, rear, and front may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices. Furthermore, such terms as "toy," "treat toy," and "treatball" are used interchangeably.

Figure 1A:
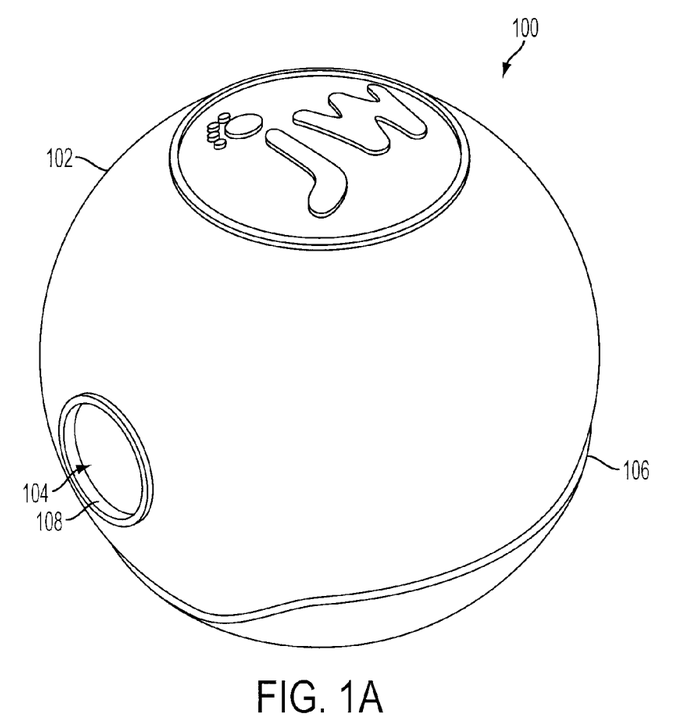
FIG. 1A is a perspective view of a preferred embodiment of the inventive toy according to the present invention.
Figure 1B:
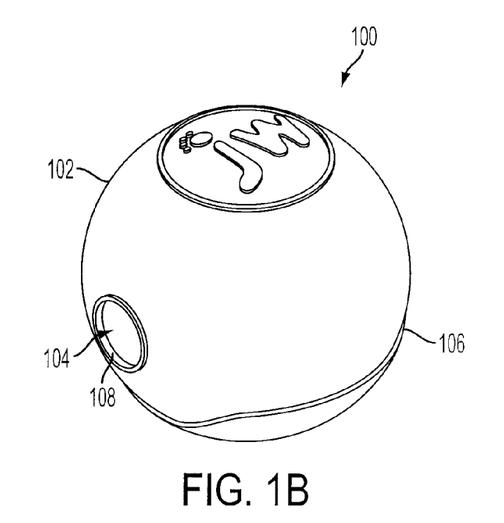
FIG. 1B is a perspective view of the preferred embodiment of the present toy similar to the one shown in FIG. 1A, but having a smaller size.

Turning now specifically to FIGS. 1A and 1B, two identically shaped, but differently dimensioned treatballs 100 may be packaged individually to meet the individual needs of dogs classified in accordance with their respective size, which typically includes large, medium and small size dogs. In an alternative embodiment, however, more than one toy 100 can be packaged together so as to constitute a kit. One of the reasons for having the kit is that a pet may like one of the packaged toys 100 and, for some reason, ignore the other one regardless of the size of toys 100. Treatball 100 is preferably a single unit, which is made from a moldable material selected from a substantially rigid material, such as plastic or foam, or a flexible material, such as rubber or plastic. In some embodiments, the treatball 100 may be molded from a single material in a single pour step.

Focusing on FIG. 1A, a perspective view of an example embodiment of a treatball 100 is depicted. The treatball 100 may include an exterior wall 102 that may be formed in the shape of a spheroid or round ball. The exterior wall 102 may include one or more ports or openings 104 for inserting or dispensing a treat. The exterior wall 102 may also include texturing 106 on the outer surface of the treatball 100. The opening 104 may include a lip 108 that defines and/or reinforces the edge of the opening 104.

Turning to FIG. 1B, a different sized embodiment of a treatball 100 is depicted. The same reference numerals are used to identify the corresponding features.

Referring to both FIGS. 1A and 1B, the exterior wall 102 of a treatball 100 may be manufactured of a compressible elastic material such as rubber or plastic. Likewise, the structure (e.g., thickness, density, etc.) of exterior wall 102 may be such that the treatball 100 is compressible and stretchable. The treatball 100 may be manufactured so that it can be distorted by compressive and/or stretching forces and yet, when the distorting forces are removed, return to its original manufactured shape and size. Application of such distorting forces may alter the shape of (e.g., elongate) opening 104 so as to cause a treat within the treatball 100 to be dispensed. The manufacture of exterior wall 102 from a compressible material may further provide improved bounce characteristics when treatball 100 is thrown onto either hard or soft surfaces. Further, the compressible structure and material of exterior wall 102 may absorb impacts resulting from bouncing or other shocks so that treats within the treatball 100 are protected and not broken by the impacts. In some embodiments of the present invention, exterior wall 102 may be constructed to be durable enough to withstand chewing by an animal. Additionally, a material that emits a squeaking sound when chewed by an animal may be selected for constructing exterior wall 102.

In some embodiments, exterior wall 102 may be manufactured using any of a variety of different colored material, as well as using a clear or multi-color material. Additionally, exterior wall 102 may be manufactured from a material that may include a scent attractive to animals. Some embodiments of treatball 100 may include lighting and/or electronic sound generators within the exterior wall 102.

The one or more ports or openings 104 may be in any shape including a circular opening. The openings 104 may be of any practicable size to allow insertion or dispensing of different sized or shaped treats. Additionally, the openings 104 may be sized to view treats inside treatball 100. As indicated above, the treatball 100 may include ports or openings 104 which become temporarily distorted when compressive force is applied. Temporary distortion of openings 104 may allow for treats to be retrieved with either greater ease or greater difficulty. In other embodiments, the treatball 100 may include openings 104, which do not become distorted (e.g., remain rigid or at least more rigid than exterior wall 102 when compressive force is applied.

Texturing 106 of the outer surface of exterior wall 102 may be embodied to allow for better gripping of treatball 100, either by pet owners or pets. Some embodiments of treatball 100 may have texturing 106 characteristics including, for example, bumpy, spiky, orange peel, and/or smooth surfaces. The texturing 106 may be such that the visual appearance of the overall treatball 100 is enhanced by intriguing and/or attractive patterns, designs, symbols, and/or the like. Texturing 106 may include words or trademarks in relief. Texturing 106 and/or coloring of the exterior wall 102 may be used to make the treatball 106 appear to be a different object such as, for example, a soccer ball, a basketball, a relief globe/map, a stone, a pumpkin, etc. Texturing 106 may be used to imbalance the treatball 100 by irregularly distributing weight about the surface of the exterior wall 102 to cause the treatball 100 to roll and bounce erratically and/or unpredictably. Texturing 106 may also be used to reinforce or weaken portions of the structure of exterior wall 102 to cause a desired or predefined distortion pattern (e.g., collapse along a predefined meridian) when compressive force is applied to the exterior wall 102. Such a desired or predefined distortion pattern may cause treats within the treatball 100 to advance through the toy 100.

Lip 108 may be of any thickness, height or width surrounding openings 104. Lip 108 may extend out from treatball 100 opening 104 at any length. In some embodiments, lip 108 may provide reinforcement of openings 104 to prevent damage from wear due to extended usage of treatball 100.

Figure 2:
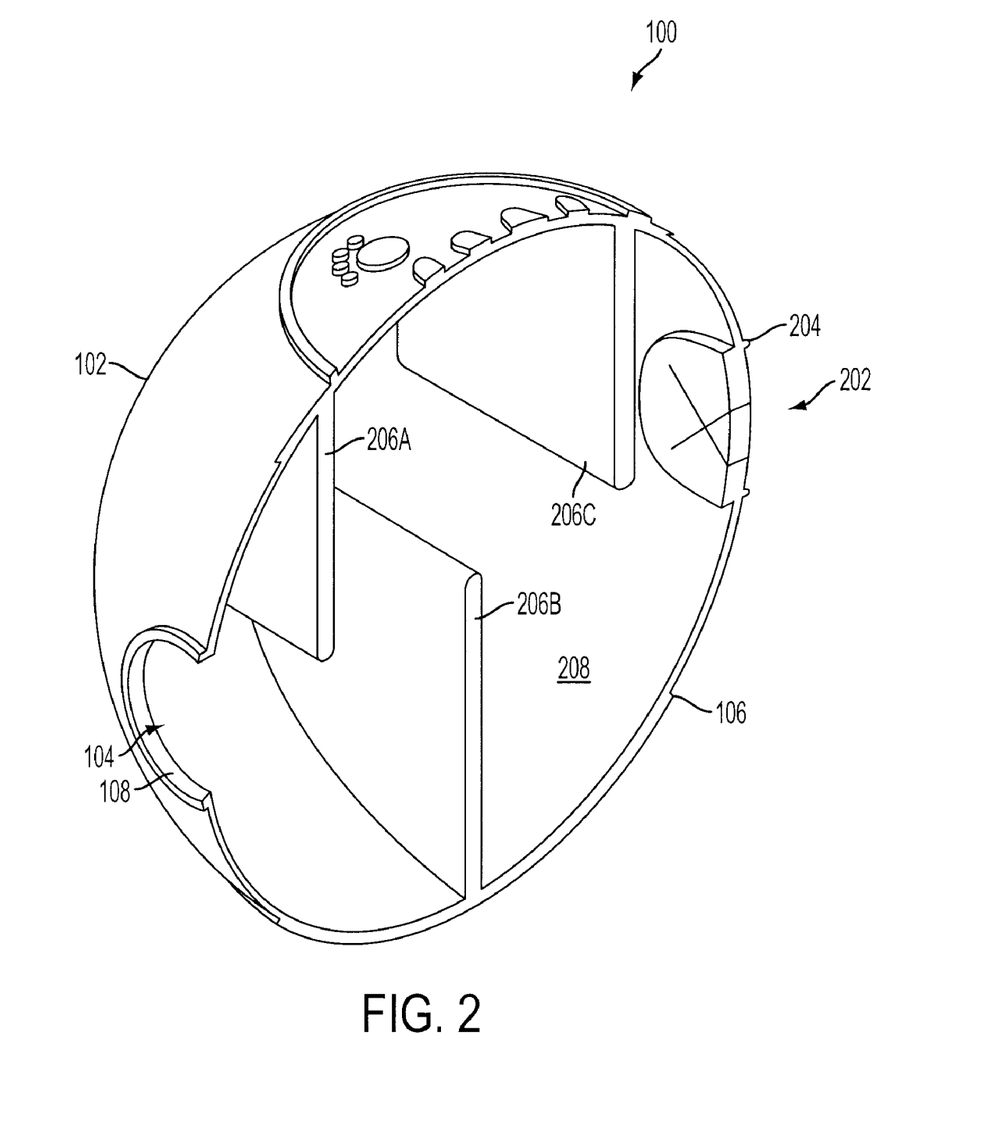
FIG. 2 is a perspective cross-sectional view of the inventive toy of FIG. 1.

Turning to FIG. 2, a cross-sectional perspective view of an example embodiment of a treatball 100 is depicted. An embodiment of treatball 100 may include one or more covered ports or openings 202. Similar to opening 104, covered opening 202 may include a lip 204 to reinforce the edge of opening 202. Treatball 100 may include one or more baffles 206A, 206B, 206C extending from the inner surface 208 of the exterior wall 102.

Covered opening 202 may be of any size or shape including a circle and may include any practicable covering or flap.

Covered opening 202 may include characteristics or features such that treats may not be easily removed or dispensed via covered opening 202 allowing for a defined, one-way entry point. Covered opening 202 may function to ensure that treats do not fall out prematurely or without interaction between the treatball 100 and the pet. Covered opening 202 may allow treats to be inserted into treatball 100 at a point farthest away from opening 104. Maximizing the distance that the treat must travel within the treatball 100 may provide an enhanced challenge to an animal attempting to retrieve a treat. Covered opening 202 may be of any practicable size to allow insertion while preventing dispensing of different sized or shaped treats. As with the one or more openings 104, in some embodiments, the treatball 100 may include one or more covered openings 202 that do not become distorted (e.g., remain rigid or at least more rigid than exterior wall 102) when compressive force is applied to the treatball 100. In some embodiments, covered opening 202 may be diametrically disposed relative to dispensing opening 104 as pictured in FIG. 2. In other embodiments, the openings 104, 204 may be adjacent to each other but still at opposite ends of a predefined path through treatball 100. In yet other embodiments, the ports or openings 104, 204 may be disposed at right angles or at any other relative positions that can be practicably used to provide an entrance and exit for treats.

One or more baffles 206A, 206B, 206C may be attached to, or extend from, the interior surface 208 of the exterior wall 102 of treatball 100. The baffles 206a, 206b, 206c may be embodied so as to prevent treats from passing directly through treatball 100 on a direct or straight path. Thus, baffles 206A, 206B, 206C may provide an enhanced challenge to an animal when attempting to retrieve treats from treatball 100. In the example embodiment depicted in FIG. 2, the baffles 206A, 206B, 206C are implemented as semi-circular partitions disposed perpendicular to, and above (206A, 206C) and below (206B), a center line (not shown) running directly from the covered opening 202 to the dispensing opening 104. The baffles 206A, 206B, 206C may be of any size, shape, thickness, rigidity, etc. that is practicable to prevent treats from passing straight through the treatball 100 while still allowing treats to pass through if an animal playing with the toy 100 executes or performs an effective or proper sequence of interactions with the toy 100.

In alternative embodiments, additional or alternative baffles may be included in addition to or in alternative to baffles 206A, 206B, 206C. In some embodiments, treatball 100 may include a spiral tunnel or other limited paths through treatball 100. Baffles 206A, 206B, 206C may be attached to the interior surface 208 of exterior wall 102 parallel to each other or askew. In some alternative embodiments, the quantity, placement and length of baffles may vary.

Figure 2A:
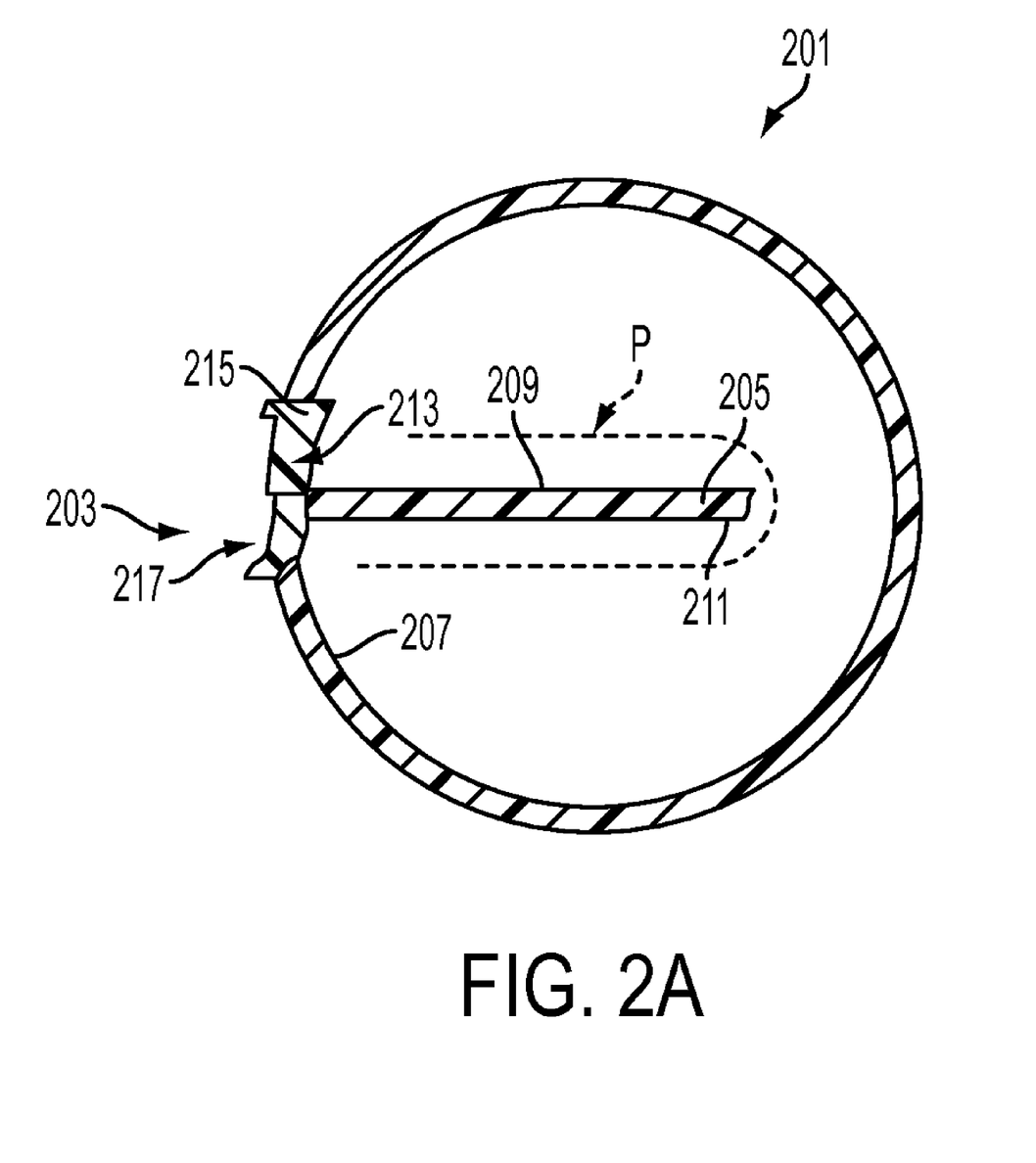
FIG. 2A is a cross-sectional view of the inventive toy of FIG. 1 illustrating a single baffle.

In further alternative embodiments shown in FIG. 2A, instead of multiple covered receiving ports or openings 202 and dispensing ports 104, treatball 100 may have a single port 105. The baffles, then, are so configured that at least one of them 205 adjoins port 105 along interior surface 107 of the treatball so that one of opposite surfaces of the baffle's wall 209, 211 defines the upstream of a path "P" of treats through the interior of treatball and the other the downstream of the path. Consequently, port 205 is divided into two adjacent sectors: a receiving sector 213 closable by one or more flaps 215 in the manner discussed above and a dispensing sector 217. In this embodiment, like in the above discussed embodiments, treats are inserted through the closable port sector and, then are displaced along the treat path which is defined by a single or a plurality of baffles configured so that the treats can be retrieved through the dispensing sector.

Additional embodiments of treatball 100 may include a noise maker (not pictured) or other electronic sound generator for attracting the animal's attention and providing stimulation/feedback to the animal.

Figure 3:
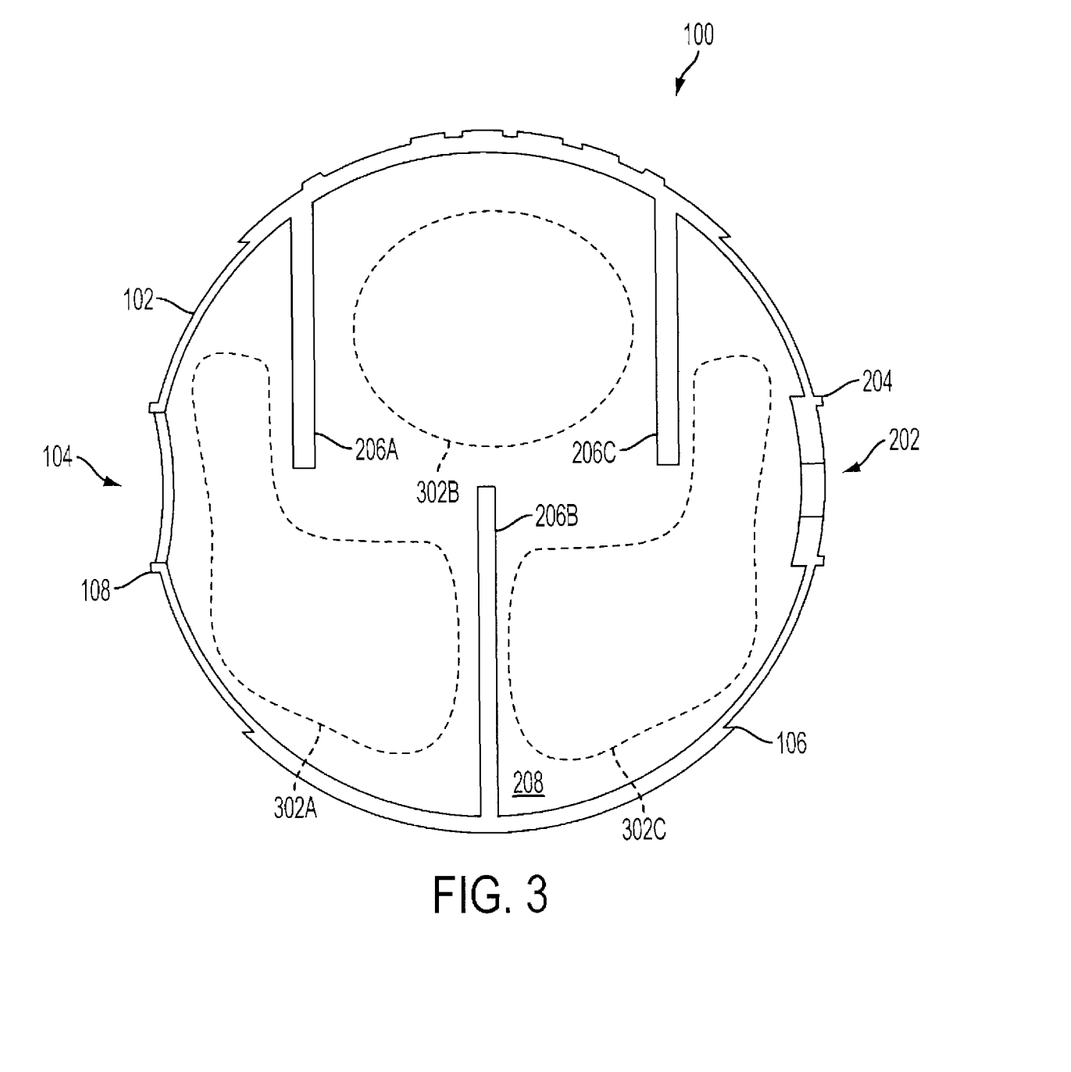
FIG. 3 is a side elevational view of a cross-section of the inventive toy shown in FIG. 1.

Turning to FIG. 3, a side elevational view of a cross-section of an example embodiment of a treatball 100 is depicted. This view more clearly illustrates the relative size, shape and locations of baffles 206A, 206B, 206C in relation to the overall diameter of the exterior wall 102 and the openings 104, 202 of the example embodiment. The illustrated proportions may be suitable for particular shaped treats. Alternative proportions may be suitable for different shaped treats. For example, the depicted proportions may allow passage of longer rectangular shaped treats while an embodiment with larger and more numerous baffles may only allow passage of small round treats.

The baffles 206A, 206B, 206C may be thought of as defining a series of adjacent chambers 302A, 302B, 302C within the treatball 100. An animal playing with the toy 100 may cause the treats to traverse these chambers 302A, 302B, 302C, leading from the covered opening 202 to the dispensing opening 104, by manipulating and interacting with the treatball 100. In some embodiments, the chambers 302A, 302B, 302C may be shaped and sized to control the level of difficulty associated with moving treats through the treatball 100. In some embodiments, a pet owner may be able to add, remove, and/or alter baffles and or chambers within the treatball 100 to adjust the level of challenge to be appropriate for the owner's particular pet. In other embodiments, the pet owner may select different sized and shaped treats to adjust the level of challenge for a given pet.

Figure 4:
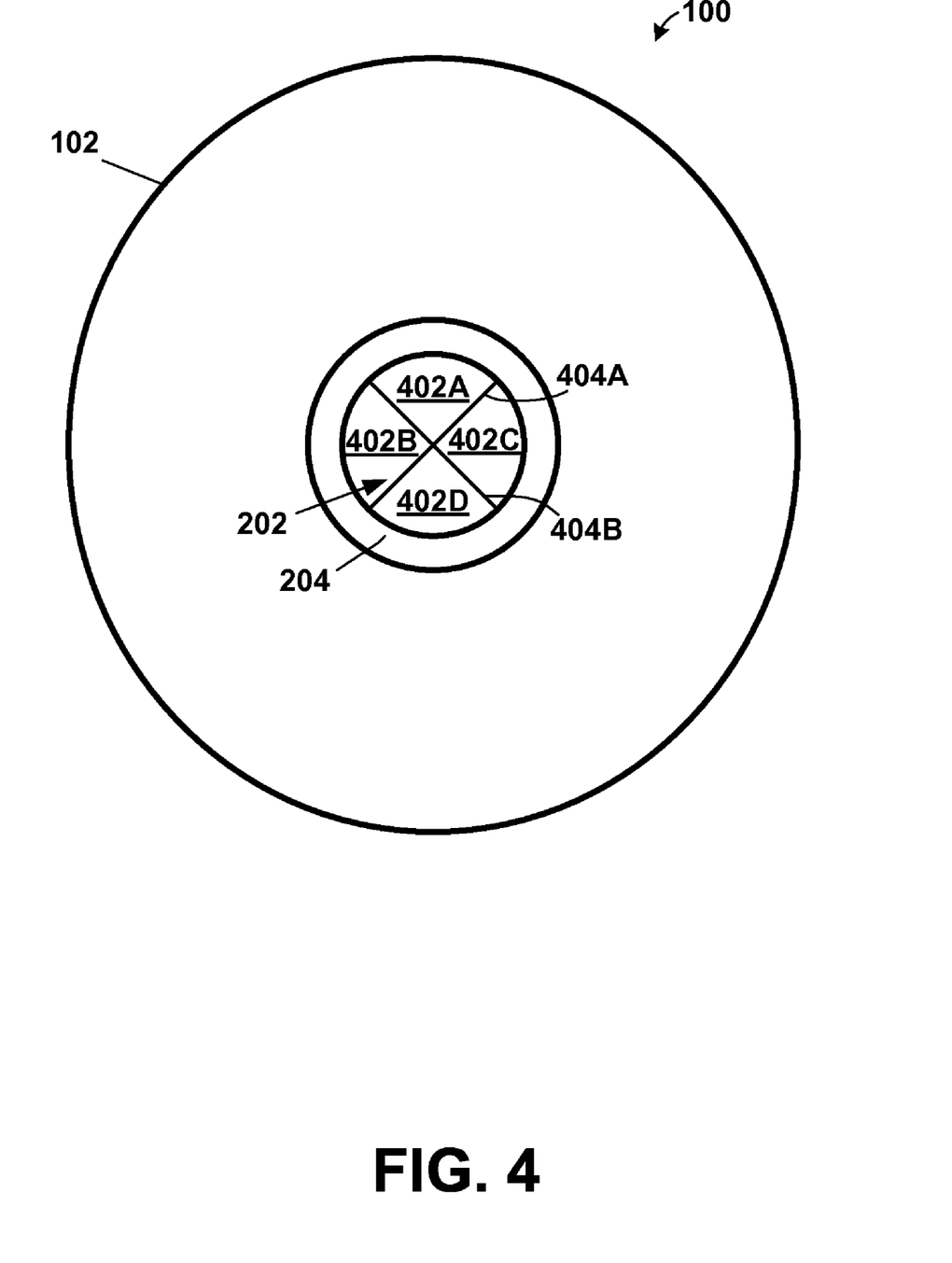
FIG. 4 is a first diagrammatic planar view of the inventive toy of FIG. 1.

Turning to FIG. 4, a diagrammatic planar view showing details of an example embodiment of the covered opening 202 of the treatball 100 is provided. The covering of the opening 202 may be formed by flaps 402A, 402B, 402C, 402D that together allow treats to be pushed into the treatball 100 but obstruct the treats from exiting via the covered opening 202. In some embodiments, the flaps 402A, 402B, 402C, 402D may be formed by cutting a membrane (initially spanning the opening 202) along cut lines 404A and 404B.

Figure 5:
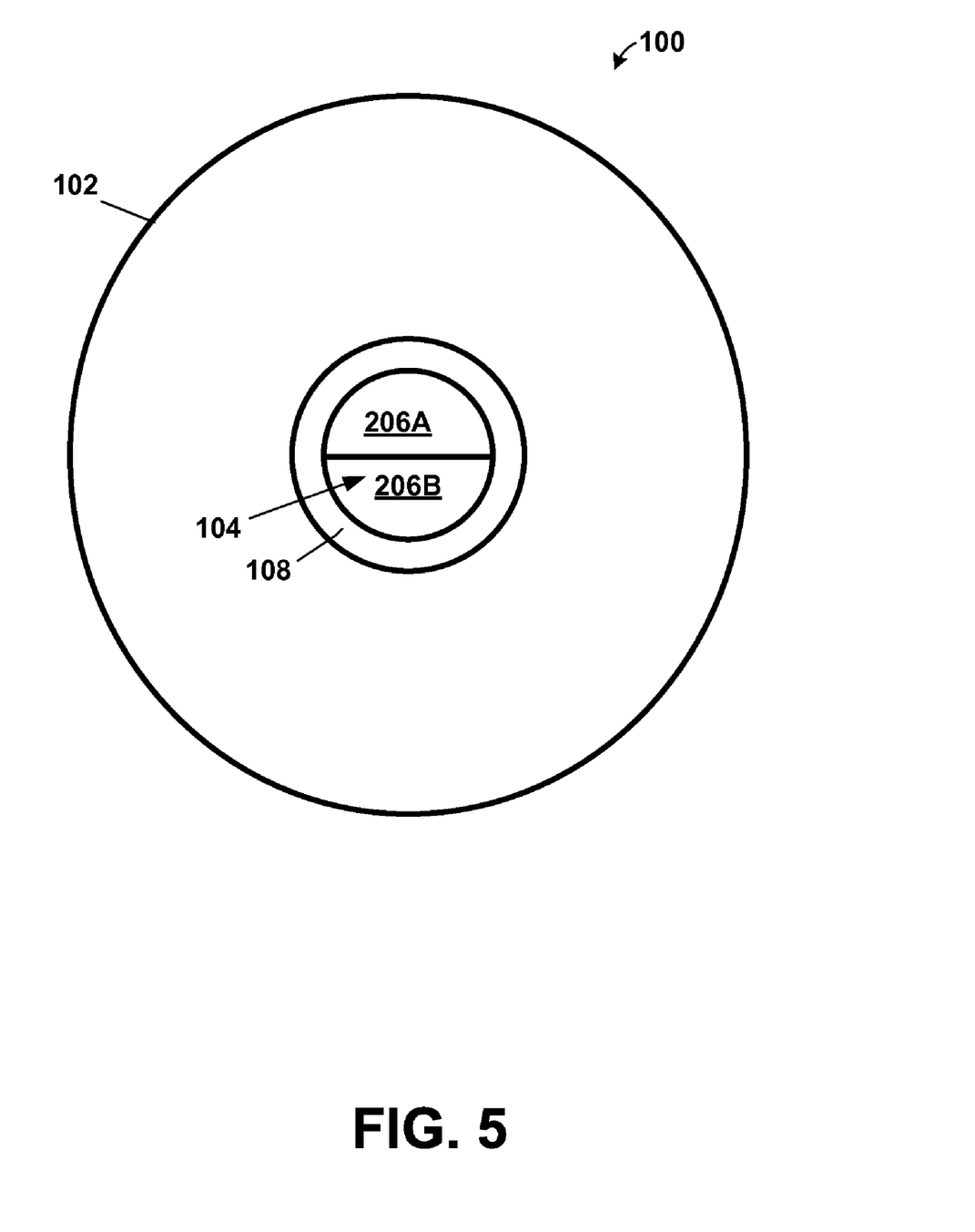
FIG. 5 is a second diagrammatic planar view of the inventive toy of FIG. 1.

Turning now to FIG. 5, a diagrammatic planar view depicting the dispensing opening 104 of the treatball 100 is provided. Looking into the unobstructed opening 104, baffles 206A and 206B may be seen. These baffles 206A, 206B may prevent an animal that is interacting with the toy 100, from initially seeing any inserted treats. However, the animal is likely to be able to smell the treats and hear the treats hitting the interior surface 208 (FIG. 2) and the baffles 206A, 206B, 206C as the treatball 100 is moved. This awareness of the treats is likely to stimulate the animal to further interact with the treatball 100. With further interaction, the animal may be able to view treats as they move into the chamber 302A closest to the opening 104. This view may further excite the animal and provide additional motivation to work for the treats.

Returning to FIG. 1, it is particularly desirable to produce toy 100 in as simple a manner as possible. Thus, it is preferred, but not limited, that toy 100 has a unitary, one-piece construction. Since the toy must have a shape and be made of material that is suited for bouncing and rolling, the toy may be made using an internal mold as further disclosed in U.S. Pat. No. 6,651,590, which is hereby incorporated by reference in its entirety, and using an elastomeric material, which is preferably natural rubber, synthetic natural rubber, or a blend of natural rubber or synthetic natural rubber and one of a plurality of blending polymers including butadiene rubber, styrene-butadiene rubber, nitrile rubber and ethylene-propylene-diene-monomer rubber.

Thus, an inside mold advantageously forms at least one baffle, and preferably baffles 206A-C, and is disposed between at least one outside mold. The inside mold further advantageously forms at least one cavity defined by inner surface 208 and more preferably forms chambers 302A-C defined by inner surface 208 and baffles 206A-C. Therein, the baffles are sized so as to allow the mold to be removed. Additionally, the mold forms a corresponding internal lip of opening 104 and the interior portion of opening 202. After the inner mold forms toy 100 in cooperation with at least one outer mold, the inner mold is removed from toy 100. This may be accomplished preferably by removing the inner mold through opening 104, although opening 202 may also be used after being made more suitable for the task. Therein, it is preferred that the inner mold is removed while the elastomeric material, which has suitable hot tear resistance, is of a suitable temperature.

This document describes the inventive toy for illustration purposes only. Neither the specific embodiments of the invention as a whole, nor those of its features limit the general principles underlying the invention. In particular, the invention is not limited to any specific configuration of openings 104, 202, shapes of treatball 100 or treats, texturing 106, and baffles 206A, 206B, 206C. The specific features described herein may be used in some embodiments, but not in others, without departure from the spirit and scope of the invention as set forth. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention as defined by the appended claims.

What is claimed is:

1. A method of making a treatball, the method comprising the steps of:
    (a) introducing an elastomeric material onto an internal mold;
    (b) molding the elastomeric material into an elastic body having a peripheral wall and at least one opening in the peripheral wall, the opening being configured to selectively receive and dispense treats passing through the body;
    (c) extracting the internal mold from the body, thereby removing a core of the body through the opening so as to have an inner surface of the peripheral wall formed unitarily with one or more spaced baffles extending inwards from the inner surface and configured to define an elongated nonlinear path along which the treats are advanced through the body before being dispensed therefrom.

2. The method of claim 1, wherein step (b) includes configuring the one opening to be smaller than an individual treat to prevent voluntary displacement of the treats from body.

3. The method of claim 1, wherein step (b) includes forming a second opening spaced diametrically opposite from or at an angle differing from a 180 angle from the one opening, the second opening being configured to receive the treats if the one opening dispenses the treats, and to dispense the treats if the one opening receives the treats.

4. A method of making a treatball, the treatball comprising an elastic rubber body restorably compressible in response to an external force applied to the body;
    a treat receiving opening and a treat dispensing opening in the body;
    a unitary guide unit molded unitarily with the body and comprising a plurality of spaced-apart baffles, an inner surface of the body, and a plurality of chambers, the unitary guide unit defining an elongated nonlinear path through from the treat receiving opening to the treat dispensing opening along which the treats are advanced before being dispensed from the body, at least some of the spaced-apart baffles extend in opposite directions and are configured with respective free end portions terminating in a common plane or overlapping one another to define the nonlinear path;
    the method comprising
    (a) introducing an internal mold into a multi-part cavity mold;
    (b) introducing an elastomeric material between the cavity mold and the internal mold to form a rough treatball;
    (c) removing the rough treatball with the internal mold from the cavity mold;
    (d) extracting the internal mold from the rough treatball, wherein the elastomeric material has sufficient hot tear resistance to allow the internal mold to be extracted through an opening of the treatball without tearing the treatball.

5. The method of claim 4, wherein the baffles are formed by the internal mold.

6. The method of claim 4, wherein the internal mold forms an internal lip of the opening.

7. The method of claim 4, wherein the elastomeric material is selected from the group consisting of butadiene rubber, styrene-butadiene rubber, nitrile rubber, ethylene-propylene-diene, natural rubber, synthetic rubber, and a blend of natural and synthetic rubber and a combination of these allowing the treatball to roll and bounce.

8. A method of making a treatball having a plurality of spaced-apart internal baffles, the method comprising the steps of:
    (a) providing an internal mold,
    (b) introducing an elastomeric material onto said internal mold,
    (c) molding the elastomeric material into a shape that is representative of the treatball,
    (d) extracting the internal mold through an opening in the treatball,
    wherein the elastomeric material has sufficient hot tear resistance to allow the internal mold to be extracted through the opening of the treatball without tearing the treatball.

9. The method of claim 8, wherein the baffles are formed by the internal mold.

10. The method of claim 8, wherein the internal mold forms an internal lip of the opening.

11. The method of claim 8, wherein the elastomeric material is selected from the group consisting of butadiene rubber, styrene-butadiene rubber, nitrile rubber, ethylene-propylene-diene, natural rubber, synthetic rubber, and a blend of natural and synthetic rubber and a combination of these allowing the treatball to roll and bounce.

\* \* \* \* \*